Dale R. Maley,
INVENTOR.

BY.

ATTORNEY.

June 24, 1969 D. R. MALEY 3,451,254
NONDESTRUCTIVE TESTER
Filed July 26, 1965

Dale R. Maley,
INVENTOR.

BY.
ATTORNEY.

United States Patent Office 3,451,254
Patented June 24, 1969

3,451,254
NONDESTRUCTIVE TESTER
Dale R. Maley, Boulder, Colo., assignor to Automation Industries Inc., Los Angeles, Calif., a corporation of California
Filed July 26, 1965, Ser. No. 474,661
Int. Cl. G01n 25/00
U.S. Cl. 73—15                    12 Claims

ABSTRACT OF THE DISCLOSURE

A nondestructive testing system is disclosed wherein an infrared pickup scans a workpiece to indicate the presence of defects by sensing variations in surface temperature caused by defects. The pickup includes means for detecting radiations in two different frequency bands whereby variations in the emissivity of the surface do not materially affect the indications.

---

Figure 1:
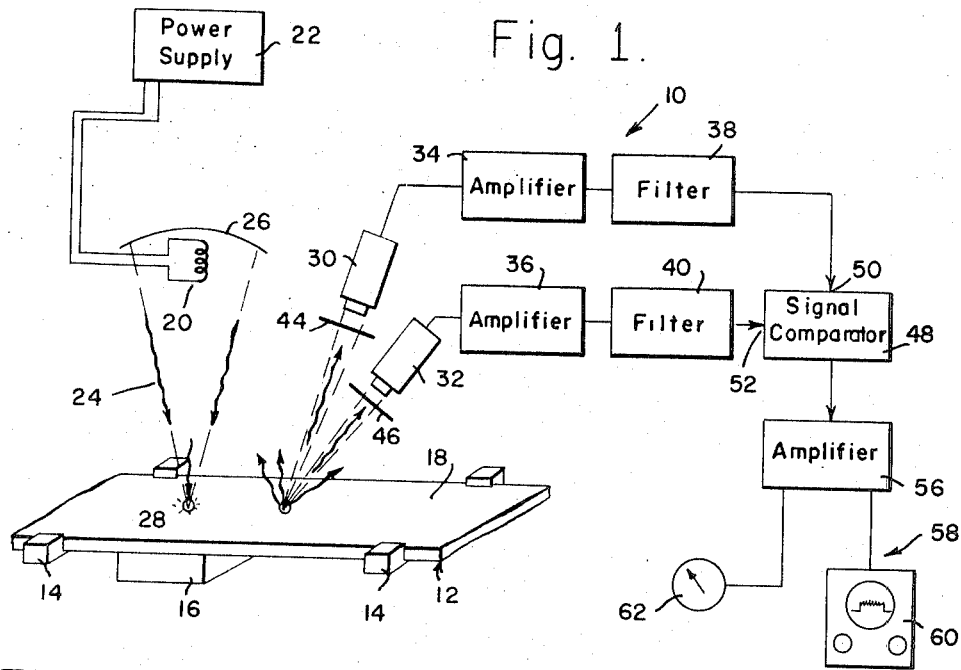

The present invention relates to testers for inspecting workpieces and, more particularly, to nondestructive testers capable of inspecting workpieces for hidden defects by means of infrared energy.

At the present time there are several different types of nondestructive testing systems capable of inspecting workpieces for hidden defects, etc. These systems transmit some form of energy into or through the workpiece and observe the manner in which the workpiece and energy inter-react. Of all the forms of energy that have been employed for this purpose, ultrasonic, magnetic, eddy currents, etc., are most suitable for commercial purposes. In recent years numerous attempts have been made to develop a commercially satisfactory nondestructive tester employing infrared energy and heat. The thermal conductivity of a workpiece is a function of the type of material. However, it is also greatly affected by variations in such factors as porosity, voids, inclusions, grain structures, thickness, etc. Since thermal conductivity controls the flow of heat, if there are local variations in any of these characteristics there will be corresponding local variations in the manner in which heat flows through the workpiece and the manner in which the temperature of the workpiece varies. As a result, the temperatures of the incremental areas on the surface of the workpiece will vary at different rates as the temperature of the workpiece changes. It is thus possible to determine the various characteristics of a workpiece, and particularly the presence of internal defects, i.e., a void, an inclusion, a variation in the thickness, etc., by observing the surface temperature of the workpiece.

In order to measure the surface temperature and particularly in small incremental areas, the surface may be scanned with a device such as a radiometer that receives the infrared energy radiated from the surface. The intensity of such energy is a function of the fourth power of the temperature of the surface. However, the radiation is also a direct function of the emissivity of the surface. Accordingly, if the surface emissivity varies the radiation varies by a corresponding amount. In those systems wherein relatively small temperature changes, i.e., less than 50 degrees, are being sensed, the normal variations in emissivity produce variations in the radiation that are large compared to the variations resulting from changes in temperature. Heretofore, in order to avoid errors from this effect, it has been necessary in infrared nondestructive test systems to eliminate variations in emissivity by painting the entire surface a uniform black. Since this is a time consuming and costly operation and frequently destroys the workpiece, infrared test systems have not found wide commercial acceptance.

The present invention overcomes the foregoing disadvantages and limitations. More particularly, the present invention provides an infrared nondestructive test system capable of inspecting a workpiece for internal defects without altering the emissivity of the surface of the workpiece and capable of providing a signal which is solely a function of the temperature even though the surface emissivity varies. This is accomplished by sensing radiations in two separate frequency bands to provide two separate radiation signals. Even though a change of emissivity will cause the amplitudes of these signals to vary, the ratio between their amplitudes will remain the same for any given temperature. However, as the surface temperature changes, the ratio of their relative amplitudes changes. Thus, by comparing the two radiation signals, a temperature signal can be obtained that is independent of the emissivity.

In the limited number of embodiments of the present invention disclosed herein, the workpiece is heated by projecting electromagnetic energy onto its surface whereby the temperatures of the various incremental surface areas are a function of the internal characteristics of the workpiece immediately adjacent thereto. Radiometer means which are responsive to radiations in two different wavelengths scan the successive incremental areas and produces a pair of radiation signals that are, in part, functions of the temperature of the area, and, in part, functions of the emissivity. Means are effective to divide one radiation signal by the other and produce a ratio signal. Since both of the radiation signals are the same function of the emissivity, this function is cancelled whereby the resultant ratio signal is a function of surface temperature. Thus, this signal will be independent of any variation in the emissivity and can be used as a reliable indication of the quality of the workpiece and the presence or absence of any defects.

Figure 2A:
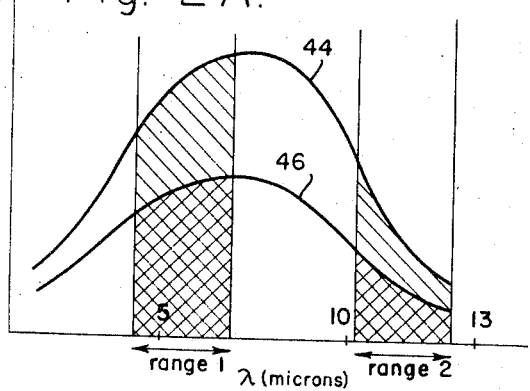
Figure 2B:
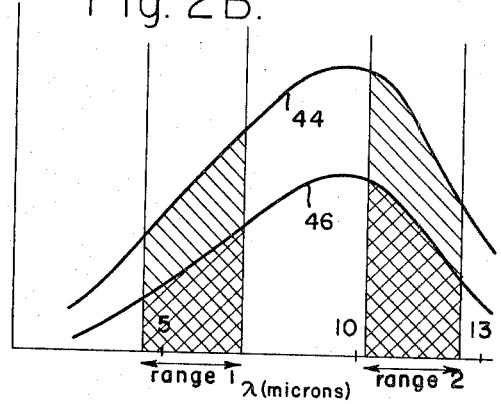
Figure 3:
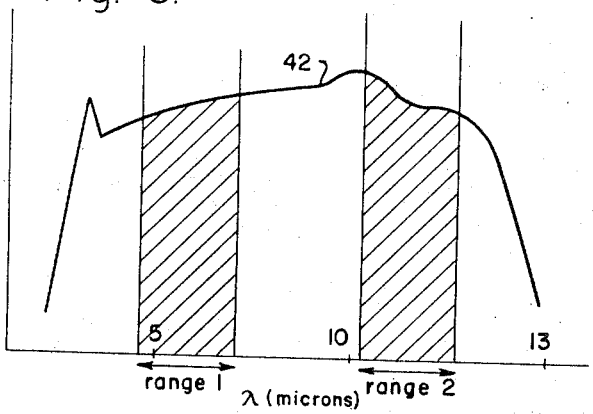
Figure 4:
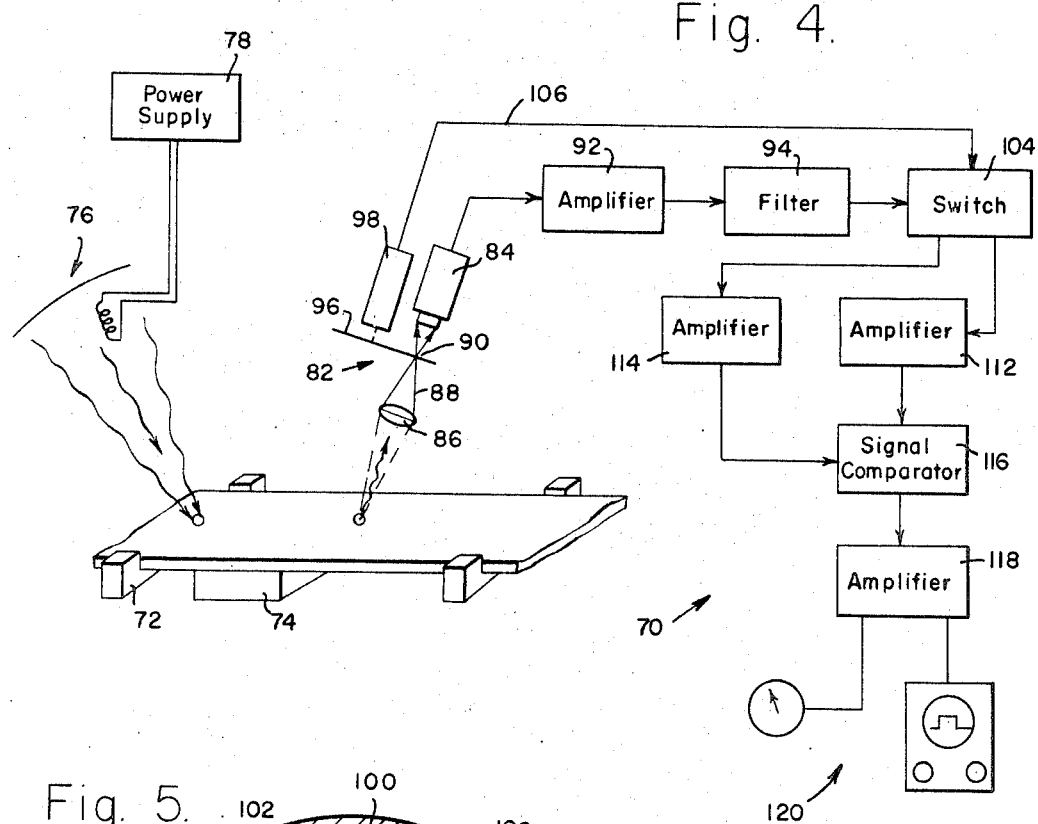
Figure 5:
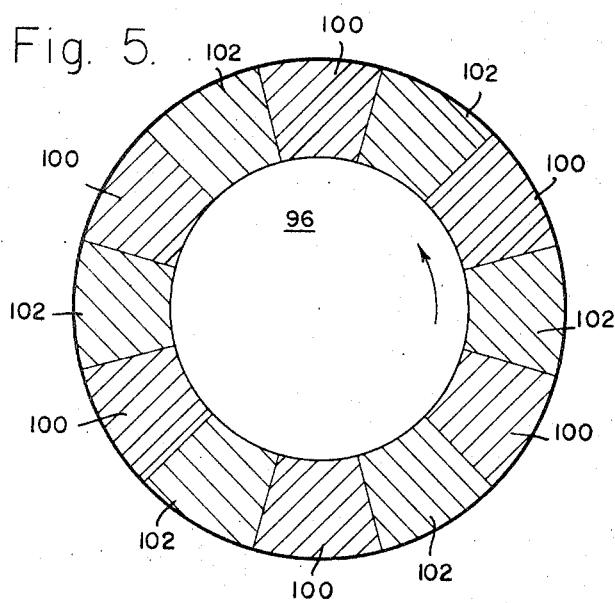

These and other features and advantages of the present invention will become readily apparent from the following detailed description of a limited number of embodiments thereof, particularly when taken in combination with the accompanying drawings wherein like reference numerals refer to like parts and wherein:

FIGURE 1 is a block diagram of an infrared test system embodying one form of the present invention, FIGURE 2 is a set of graphs showing the characteristics of the system during different operating conditions, FIGURE 3 is a graph showing another operating characteristic of the system, FIGURE 4 is a block diagram of an infrared test system embodying a modified form of the present invention, and FIGURE 5 is a view of a filter wheel employed in the system of FIGURE 4.

Referring to the drawings in more detail, the present invention is particularly adapted to be embodied in a nondestructive test system 10 for inspecting workpieces. The test system 10 is shown as inspecting a relatively flat sheet 12 and is capable of detecting and locating hidden defects and/or measuring the dimensions of the workpiece 12.

The system 10 includes a support 14 for retaining the workpiece 12 in position during a test. A scan mechanism 16 is coupled to the support 14 for moving the workpiece 12. The workpiece 12 may be carried in only one direction. However, when the entire surface 18 of the workpiece 12 is to be inspected, it may be moved in one direction at a first rate and in a second direction at a second rate of speed whereby the entire surface 18 is scanned in a series of generally parallel lines.

During a test, the temperature of the workpiece 12 is varied by transferring heat into or out of the workpiece 12. Although the heat may be transferred into the entire workpiece 12, in this tester 10 the heat is successively applied to limited areas as the workpiece 12 is being scanned. The heat may be produced by any suitable heater 20 such as the filament of an incandescent lamp connected to a power supply 22.

The heat generated by the heater 20 is focused into a well defined beam 24 by a lens and/or mirror 26. The beam 24 concentrates substantially all of the energy into a relatively small "hot spot" 28 positioned on the surface 18 of the workpiece 12. The amount of power supplied to the "hot spot" 28 and the size of the spot will depend upon the nature of the material, the type of test being performed, the rate of scan, etc. Under most circumstances, the rate of heat transferred into the workpiece 12 will normally produce a surface temperature rise in the general range of about 25° to 50° above ambient. This results in most of the energy radiated from the surface 18 having a wavelength in the range of about 2 microns to about 15 microns. As the radiant heating energy in the beam 24 is incident upon the surface 18 of the workpiece 12, heat will be created at the "hot spot" 28 in the region immediately adjacent to the surface 18. A portion of this heat will be conducted into the interior of the workpiece 12 whereby it will flow transversely through the workpiece 12 toward the back surface and laterally through the workpiece 12 generally parallel to the front and back surfaces. Another portion of the heat will be reradiated from the surface 18 of the workpiece 12 in the form of infrared energy. The wavelengths and the amounts of radiated energy will be a function of the temperature of the surface 18.

The rate at which the heat is transferred into and through the interior of the workpiece 12 is a function of a large number of factors such as the thermal conductivity of the material, the amount of temperature differential, the dimensions of the material, etc.

A relatively thick workpiece will act as a heat sink and the heat will tend to rapidly flow or disperse throughout the entire interior of the workpiece. Since such a workpiece can absorb the heat rapidly, little energy will remain near the surface and the surface temperature will not rise appreciably. As a consequence, the amount of infrared radiation will be small and have long wavelengths.

A relatively thin workpiece will not be able to absorb as much heat or at such a high rate. The heat will rapidly flow to the back surface whereby the ability of the workpiece to absorb additional heat will be determined by the rate at which the energy can flow laterally through the workpiece in directions parallel to the front and back surfaces. It can thus be appreciated that for a given amount of energy the temperature on the surface of a thin workpiece will rise more rapidly and to a higher level than on a thick workpiece.

If the interior of the workpiece is homogeneous, the rate and amount of transfer of energy throughout the workpiece will be uniform as the "hot spot" 28 scans across the surfaces 18 and the temperature rise will be a function of the thickness. However, it should be noted that irrespective of whether the workpiece 12 is thick or thin, if there are any internal localized discontinuities in the workpiece 12, such as an air pocket or void, some form of inclusion, a change in porosity or grain structure, a variation in thickness, etc., there will be a corresponding localized variation in the thermal conductivity of the workpiece 12. As a consequence, there will be localized variations in the temperature on the surface 18 corresponding to the internal variations of the workpiece 12.

Accordingly, the instantaneous temperatures of the incremental surface areas on the workpiece 12 will be a function of the thermal conductivity of the member which, in turn, is a function of the characteristics of the workpiece 12 including its thickness, internal integrity, etc.

Any suitable form of pickup means may be employed to sense this surface temperature. In the present instance, so-called radiometer pickup means 30 are employed. The infrared radiometer is responsive to radiated energy in the infrared region of about 1 or 2 microns up to about 15 microns, and produces an electrical signal that is a function of the intensity or amount of radiation.

In the embodiment of FIGURE 1, a pair of radiometers 30 and 32 are focused on the surface 18 of the workpiece 12. Preferably, these radiometers 30 and 32 are focused on the same incremental area and receive the same amounts of infrared energy. The magnitude or amplitude of these radiations and the wavelength will vary as the fourth power of the surface temperature. As a result, the signals from the radiometers 30 and 32 will correspond to the fourth power of the temperature of the incremental area.

The incremental area upon which radiometers 30 and 32 are focused is positioned on the same scan line as the "hot spot" 28 formed by the heater 20. However, the incremental area being scanned is displaced from the "hot spot" 28. Thus, the radiometers 30 and 32 scan the area a predetermined time interval after it was heated by the heater 20. As a consequence, the incremental area will first be heated at a predetermined rate to form a "hot spot" 28 having a predetermined amount of energy therein. The heating of the "hot spot" 28 will then terminate and the energy will tend to disperse in the manner described above, i.e., a portion of the energy will flow through the workpiece 12 as heat and a portion will be radiated from the surface 18 as infrared energy. The rate at which the energy is conducted through the workpiece 12 and, therefore, the rate at which the temperature of the "hot spot" 28 falls will be a function of the internal characteristics of the workpiece 12. Accordingly, by measuring the amount of radiation from an incremental area a predetermined time after it was heated, the radiometers 30 and 32 will provide signals that are a function of the internal structure of the workpiece 12 adjacent that area.

Normally, the radiations from the surface 18 will be substantially uniform or will vary at a very low rate. A slowly varying or DC radiation signal of this nature requires DC amplifiers which are unstable and tend to drift. To overcome this difficulty and also to utilize the AC characteristics of the radiometers 30 and 32, it has been found desirable to employ a device such as a shutter wheel (not shown) within each of the radiometers 30 and 32. This will "chop" the radiation reaching the radiometers. The radiometers will thereby produce alternating signals having a frequency determined by the speed of the wheel and amplitudes modulated in accordance with the magnitude of the radiations.

An amplifier 34 and 36 is coupled to the output of each radiometer 30 and 32 to increase the strength of the signal to a more useful level. The outputs of the amplifiers 34 and 36 are, in turn, coupled to filters 38 and 40. These filters 38 and 40 are of the band pass variety and are tuned to the chopper frequency of the radiation signals. These filters 38 and 40 will thereby pass only the radiation signals and suppress all other signals. This will insure strong signals having high signal-to-noise ratios.

The signals from the filters 38 and 40 will thereby be AC signals having amplitudes that vary as the fourth power of the temperature of the surface 18. However, the amplitudes will also be a function of the emissivity of the incremental area of the surface 18 being scanned by the radiometers 30 and 32. That is, if the surface 18 is black or nearly black (i.e., in the infrared region) the emissivity will be high, for example 1.0, and the intensity of the radiations will also be high. However, if the surface 18 is gray and has a lesser emissivity, for example 0.5, the radiations will be only 50% of the black body radiations.

In addition to being a function of surface temperature and of surface emissivity, the signals from the radiometers 30 and 32 (and the filters 38 and 40) will also be a function of the characteristics of the transducers in the radiometers 30 and 32. Any desired type of transducer may be employed in the radiometers 30 and 32. However, it has been found desirable to employ a device such as the Texas Instrument Co. Type M–6000 Mercury-Doped Germanium Long Wavelength Infrared Detector. The characteristics of such a detector are described in Texas Instruments Bulletin No. DL–S622563 April 1962. A detector of this type is responsive to radiations having wavelengths between about 1 and 15 microns and has characteristics similar to those illustrated in FIGURE 3.

Although the response to such a detector does vary somewhat with frequency in a band from about 4 microns to about 13 microns, the response is reasonably uniform. Moreover, the response may be divided into two separate ranges such as Range 1 and Range 2. It will be observed that the response in each range is about the same, i.e., the areas bounded by the curve 42 and the range limits are approximately equal. It should be noted that although these ranges are shown as separated, they may be considerably broader and may overlap each other if desired.

The present embodiment takes advantage of this effect by providing infrared filters 44 and 46 in front of each of the radiometers 30 and 32. The first filter 44 is effective to allow only infrared radiations in the first range to reach the first radiometer 30 and the second filter 46 is effective to allow only infrared radiations in the second range to reach the second radiometer 32. It may thus be seen that the signals from the first radiometer 30 and filter 38 will be a function of the radiations from the "hot spot" 28 in the first range. Similarly, the signals from the second radiometer 32 and filter 40 will be a function of the radiations from the "hot spot" 28 in the second range.

The radiations from the "hot spot" 28 are dependent upon a large number of factors. The intensity and wavelength of the radiations will, of course, be dependent upon the size and temperature of the hot spot. By way of example, a set of radiation curves for one temperature are shown in FIGURE 2A. At this temperature the maximum intensity will occur at a wavelength of about 7 to 8 microns. Above and below this wavelength, the relative intensities decrease.

The absolute values of the intensities is a function of several variables. However, one of the more important variables is the emissivity of the radiating surface. When the emissivity is high, the radiations are large similar to the upper curve 44. Conversely, when the emissivity is low, the radiations are small similar to the lower curve 46. The emissivity will thus control the height of the curve. It should be noted that if that temperature remains the same, the emissivity will not materially alter the shape of the curve 44 or 46. That is, the maximum intensity will still be at the same wavelength and the intensities above and below that wavelength will be in the same proportions. As a result, radiations in the first and second ranges will always remain in the same ratio irrespective of the emissivity.

In the event the emissivity remains constant but the temperature changes, the wavelength of the maximum intensity of radiation will shift. For example, as may be seen in FIGURE 2B, if the temperature is lower the maximum intensity may occur in the region of about 10 microns with the radiations above and below this point shifting by corresponding amounts. At this lower temperature, the proportions of the radiations that occur in the first and second ranges will have changed.

More particularly, whereas at the higher temperature in FIGURE 2A, Range 1 has the largest portion of the radiations, at the lower temperature of FIGURE 2B, Range 2 has the largest portion. It may thus be seen that the ratio between the radiations in the two ranges will remain constant irrespective of variations in the emissivity. However, the ratio will vary as a function of the temperature of the radiating "hot spot." Accordingly, since the filters 44 and 46 divide the radiations reaching the radiometers 30 and 32 into the first and second ranges, the ratio between the signals from the filters 38 and 40 will be a function of surface temperature and independent of the surface emissivity.

The outputs of the two filters 38 and 40 may be coupled to any suitable means for determining the ratio between the signals for the first and second ranges. In the present instance, a divider or signal comparator 48 having two separate inputs 50 and 52 are coupled directly to the outputs from the filters 38 and 40. The divider or comparator 48 is effective to divide or compare the amplitudes of the two signals and produce an output or ratio signal. This ratio signal will thus be a function of the relative amounts of radiations in the first and second ranges and, therefore, of the temperature of the surface 18.

The output 54 of the comparator 48 is coupled to an amplifier 56 which is effective to increase the amplitude of the signal to a more useful level. The amplifier 56 is, in turn, coupled to a suitable readout means 58 such as an oscilloscope 60 and/or a meter 62, etc. The readout means is responsive to the signal and indicates the characteristics of the workpiece.

In order to employ the present system for testing or inspecting a workpiece 12, the workpiece 12 is first placed on the support 14. Following this, the heater 20 and scan mechanism 16 are energized. As the workpiece 12 travels past the heater 20, a "hot spot" 28 is produced on the surface 18 of the workpiece 12 and travels thereacross. A predetermined time after the formation of the "hot spot" 28 the two radiometers 30 and 32 scan the incremental areas previously heated by the heater 20 and now cooling. Since a fixed amount of heat is transferred into the workpiece 12 and a fixed interval elapses prior to scanning, the temperature of the incremental area will be a function of the thermal conductivity of the workpiece 12 adjacent thereto. The thermal conductivity is, in turn, a function of the presence or absence of discontinuities such as voids, inclusions, delaminations or lack of bonding, variations in thickness, etc.

As the radiometers 30 and 32 scan the incremental areas they produce signals that are functions of the temperature and also of the emissivity. However, each signal will be limited to the radiations which occur within Range 1 or Range 2. These two signals are then coupled through the amplifiers 34 and 36 and filters 38 and 40 into the signal comparator 48. The comparator 48 divides one radiation signal by the other and produces a ratio signal that is a function of the surface temperature and independent of the emissivity.

The readout means 58 such as the meter 62 and/or the oscilloscope 60 is responsive to the signal from the amplifier 56. They will, therefore, be responsive to the incremental thermal conductivity of the workpiece 12. Accordingly, they may be calibrated to indicate characteristics of the workpiece 12 which correspond to thermal conductivity. Thus, by observing the readout means 58, the operator may monitor the characteristics of the workpiece 12. If desired, the readout means 58 may include means for producing a permanent record and/or means for automatically sounding an alarm or rejecting the workpiece 12, etc.

Although a tester of the foregoing variety is very effective for inspecting or testing workpieces for internal defects, etc., it has been found that under some circumstances it is desirable to employ a tester 70 such as disclosed in FIGURES 4 and 5. This tester 70 employs a mounting means 72, scan mechanism 74, heater 76 and power supply 78 that are all substantially identical to their counterparts in the first tester 10. As a consequence, the heater 76 may form a "hot spot" 80 on the workpiece 12 that scans across the surface 18 in a single line or in a series of parallel lines.

The pickup means 82 is laterally spaced from the heater 76 and scans the same line as the heater 76. The pickup means 82 thereby receives the radiations from the "hot spot" 80 after it has cooled for a predetermined time. The pickup 82 may include any means that are responsive to infrared radiation and effective to produce an electrical signal proportional thereto. By way of example, in the present instance a single radiometer 84 is employed.

A collecting or focusing lens or mirror 86 may be positioned in front of the radiometer 84. This lens or mirror 86 collects a large amount of infrared radiations and focuses them into a beam 88 that is directed into the radiometer 84. For reasons that will become apparent subsequently, it is desirable for the beam 88 to be concentrated into a relatively small zone 90 at some point.

The radiometer 84 may be substantially identical to the radiometers 30 and 32 in the first tester 10 and includes a shutter or chopper wheel (not shown) that is effective to periodically interrupt the radiations reaching the radiometer. The output of the radiometer is coupled to an amplifier 92 that is effective to amplify the radiation signal to a more useful level. The output of the amplifier 92 is, in turn, coupled to a filter 94 tuned to the same frequency as that produced by the chopping wheel. The filter 94 passes the radiation signal and suppresses all other signals whereby a high signal-to-noise ratio is maintained.

A filter wheel 96 is provided in front of the radiometer 84 for modulating the infrared radiations reaching the radiometer 84. This wheel 96 is mounted on a rotating shaft and is driven by a motor 98. The periphery of the wheel 98 is disposed in the beam 88, preferably at or near the reduced zone 90. The periphery includes a plurality of infrared filters 100 and 102. These filters 100 and 102 correspond to the filters 44 and 46 in the first embodiment and are alternated so as to alternately pass only radiations in one range and then only radiations in the other range.

The radiation signals from the filter 94 will thus have two different portions. These portions occur periodically and alternate with each other and correspond to the radiations in two different ranges of wavelengths, i.e., range 1 and range 2.

The output from the filter 94 is coupled to a switch 104 which is capable of separating the two different portions of the signals from each other. The switch 104 may be of any desired variety such as a mechanical or electronic switch coupled to the filter wheel 96 as by conductor 106 and operates synchronously therewith.

The switch 104 first passes the portion of the signal corresponding to the radiations in the first range to the first output 108 and then passes the portion of the signal corresponding to the radiations in the second range to the second output 110. It may thus be seen that the signal on the first output 108 corresponds to radiations in the first range and the signal on the second output 110 corresponds to the radiations in the second range. Each of the two outputs 108 and 110 is coupled to suitable amplifiers 112 and 114 for amplifying the signals to a more useful level.

The outputs from the two amplifiers 112 and 114 are coupled to means such as a comparator 116 for comparing the two signals. This comparator 116 may be of any desired variety such as a divider which divides the signal from one output 108 by the signal from the other output 110 and produces a resultant ratio signal. The magnitude of the resultant ratio signal will thus be a function of the ratio between the radiations in the two frequency ranges 1 and 2, and will correspond to the signal from the comparator 48 in the embodiment of FIGURE 1. The output signal from the comparator 116 may be coupled to an amplifier 118 and readout mechanism 120 similar to the first embodiment.

In order to employ this embodiment, the workpiece 12 is placed on the support 72 and the scan mechanism 74 and heater 76 are turned "ON." The resultant "hot spot" 80 will then scan across the surface 18 of the workpiece 12. The radiometer 84 will then alternately receive radiations in the first range and in the second range, and the switch 104 will then synchronously separate the two portions of the radiation signal. These portions correspond to the radiations in the first and second ranges and are coupled into the amplifier 114 and 116. The signal comparator 116 will then divide these two signals by each other and produce an output signal that corresponds to the temperature of the surface 18 on the workpiece 12. The readout means 120 will respond to this signal and produce any desired form of indication.

It can be seen that both of the testers function in very similar manner. However, the second tester employs only one radiometer.

While only a limited number of embodiments of the present invention are disclosed herein, it will be readily apparent to persons skilled in the art that numerous changes and modifications may be made thereto without departing from the scope of the invention. Accordingly, the foregoing disclosure and description thereof are for illustrative purposes only and do not in any way limit the invention which is defined only by the claims which follow.

I claim:
1. A nondestructive tester for testing a workpiece, said tester including the combination of
    heat transfer means effective to produce a change of temperature in the workpiece whereby the instantaneous temperature of each incremental area of the surface of the workpiece is a function of the thermal conductivity of the workpiece adjacent thereto,
    radiometer pickup means responsive to radiation in a first wave band and to radiation in a second wave band, effective to receive radiations from the incremental areas and provide a first signal that is a function of the radiations said first wave band and provide a second signal that is a function of the radiations in said second wave band,
    scan means effective to produce relative movement between the workpiece and the heater and radiometer pickup means whereby the heater and pickup means scan the workpiece and the radiation signals vary as the radiations vary from the successive incremental areas,
    circuit means coupled to said radiometer means and responsive to said first signal and to said second signal to provide a third signal that is a function of the thermal conductivity of the workpiece independent of variations of emissivity, and
    output means coupled to said circuit means, said output means being responsive to said third signal to indicate incremental thermal conductivity of the workpiece.

2. A nondestructive tester for testing a workpiece, said tester including the combination of
    infrared pickup means receiving the infrared energy radiated from the workpiece and providing a pair of radiation signals that are a function of the infrared radiations in two different frequency bands,
    emissivity means coupled to said pickup means and responsive to the two radiation signals, said emissivity means providing a signal that is a function of the ratio between said signals, independent of variations of emissivity and
    output means coupled to said emissivity means and responsive to the ratio signal to indicate incremental thermal conductivity of the workpiece.

3. A nondestructive tester for testing a workpiece, said tester including the combination of
    infrared pickup means receiving infrared energy radiated from incremental areas on the surface of the workpiece and providing a pair of radiation signals that are functions of the radiations from the incremental areas in two different frequency bands, scan means coupled to the pickup means and said workpiece to produce relative movement between the workpiece and pickup means whereby the pickup means scans the surface of the workpiece and receives the infrared energy radiated from incremental areas of said workpiece, and output means coupled to the pickup means and responsive to the two radiation signals providing an output signal independent of variations of emissivity of said workpiece.

4. A tester for testing a workpiece, said tester including the combination of first means responsive to infrared radiation from the workpiece and producing a first radiation signal that is a function of the infrared radiation from the workpiece in a first frequency band and a second radiation signal that is a function of the infrared radiation from the workpiece in a second frequency band, second means coupled to the first means and responsive to the two radiation signals and providing a signal that is a function of the thermal conductivity of the workpiece independent of variations of emissivity, and output means coupled to the second means and responsive to the last signal to indicate incremental thermal conductivity of the workpiece.

5. A nondestructive infrared tester for testing a workpiece, said tester including the combination of means to produce a change of temperature in the workpiece whereby the instantaneous temperature of each incremental area of the surface of the workpiece is a function of a characteristic of the workpiece adjacent thereto, a first radiometer effective to scan the successive incremental areas and produce a first signal that is a function of the radiation from the incremental area, a first filter disposed in front of the first radiometer and effective to pass only radiations in a first frequency band whereby the first signal is a function of the radiations in the first band.

a second radiometer effective to scan the successive incremental areas in synchronism with the first radiometer to provide a second signal that is a function of the radiation from the incremental area, a second filter disposed in front of the second radiometer and effective to pass only radiations in a second frequency band whereby the second signal is a function of the radiations in the second band, means coupled to the radiometers and responsive to said first and second signals to provide a signal that is a function of the ratio between said signals, and output means coupled to said last means and responsive to said last signal to indicate the characteristics of the workpiece independent of variations of emissivity.

6. A nondestructive tester for testing a workpiece, said tester including the combination of a pair of radiometers receiving infrared energy radiated from an incremental area on the surface of the workpiece and producing a pair of separate radiation signals, a pair of filters disposed in front of said radiometers to pass only radiations in different frequency bands to the radiometers whereby the radiation signals are functions of the radiations in said bands, means coupled to the radiometers and responsive to said radiation signals, said means being effective to produce an output signal that is a function of the incremental thermal conductivity of the workpiece independent of variations of emissivity, scan means providing relative movement between the workpiece and the radiometers whereby the radiometers scan successive incremental areas on the surface and the last signal varies as a function of the thermal conductivity adjacent the incremental areas.

7. A nondestructive tester for testing a workpiece, said tester including the combination of a first radiometer receiving energy radiated from an incremental area on the surface of the workpiece and producing a first radiation signal, filter means passing radiations in a first frequency band to the first radiometer whereby the first radiation signal is a function of the radiations in said first frequency band, a second radiometer receiving radiations from said incremental area and producing a second radiation signal, second filter means passing radiations in a second frequency band to the second radiometer whereby the second radiation signal is a function of the radiations in said second frequency band, scan means coupled to the radiometers and said workpiece to produce relative movement between the workpiece and the radiometers whereby the radiometers scan successive incremental areas on the surface of the workpiece and provide separate radiation signals that are functions of the energy radiated in the two separate frequency bands from the incremental areas, means coupled to the radiometers and responsive to the ratio between the two radiation signals to provide a signal that is a function of the incremental thermal conductivity of the workpiece independent of variations of emissivity, and output means coupled to the last means and responsive to the conductivity signal to indicate incremental thermal conductivity of the workpiece.

8. A nondestructive tester for testing a workpiece, said tester including the combination of first pickup means receiving energy radiated from an incremental area on the surface of the workpiece and produce a first radiation signal that is a function of the radiations in a first band of frequencies, second pickup means receiving energy radiated from the same incremental area on the surface of the workpiece and produce a second radiation signal that is a function of the radiation in a second band of frequencies, means coupled to the pickup means and responsive to the radiation signals, said last means being effective to provide a signal that is a function of the two radiation signals independent of variations of emissivity, and output means coupled to the last means and responsive to the last signal to indicate incremental thermal conductivity of the workpiece.

9. A nondestructive tester for testing a workpiece, said tester including the combination of radiation means receiving infrared energy radiated from an incremental area on the surface of the workpiece and providing a signal corresponding thereto, means disposed in front of the radiation means to intermittently pass infrared radiations in two different bands of frequencies from the surface of the workpiece to the pickup means, whereby the signals from said pickup means include at least two intermittent portions that correspond to radiations in the two different bands, emissivity means coupled to the radiation means responsive to the ratio between the two portions of the radiation signals and providing a signal that is a function of said ratio independent of variations of emissivity, and output means coupled to the emissivity means and responsive to the last signal to produce an indication of incremental thermal conductivity of the workpiece.

10. A tester for testing a workpiece, said tester including the combination of pickup means responsive to the radiation from the workpiece and producing a signal that is a function of the radiation reaching said means, a filter wheel disposed in front of the pickup means, a plurality of filters on said wheel to modulate the radiation reaching said pickup means, said filters being effective to intermittently pass radiations in different frequency bands to said pickup means whereby said signal includes a plurality of different portions corresponding to the radiations in said frequency bands, means effective to separate said portions from said electrical signal and produce a plurality of signals, means responsive to said signals and effective to produce a signal that is a function of the ratio between said signals independent of variations of emissivity, and means coupled to the last means and responsive to the last signals to indicate a characteristic of the workpiece.

11. A nondestructive tester for testing a workpiece, said tester including the combination of a heater effective to transfer heat into the workpiece and produce a change of temperature in the workpiece, the instantaneous temperature of each incremental area of the surface of the workpiece being a function of the thermal conductivity of the workpiece adjacent thereto, radiometer pickup means effective to scan the successive incremental areas, a filter wheel disposed in front of said radiometer pickup means to divide the radiations in two different wave bands whereby the pickup means produces a pair of signals that are functions of the radiations from the incremental areas in said different wave bands, means coupled to said radiometer pickup means and responsive to said pair of signals to provide a signal that is a function of the thermal conductivity of the workpiece independent of variations of emissivity, and output means coupled to said last means and responsive to said last signal to indicate a characteristic of the workpiece.

12. A nondestructive tester for testing a workpiece, said tester including the combination of a heater effective to transfer heat into the workpiece and produce a change of temperature in the workpiece, the instantaneous temperature of each incremental area of the surface of the workpiece being a function of the thermal conductivity of the workpiece adjacent thereto, radiometer pickup means receiving radiations from the incremental areas, a filter wheel disposed in front of the pickup means to divide the radiations reaching the radiometer into two different wavebands, said radiometer pickup means being effective to provide a signal that is a function of the radiations in the first waveband and provide a second signal that is a function of the radiations in the second waveband, scan means effective to produce relative movement between the workpiece and the heater and radiometer pickup means whereby the heater and pickup means scan the workpiece and both of the radiation signals vary as the radiations vary from the successive incremental areas, means coupled to said radiometer means and responsive to the first signal and to the second signal to provide a signal that is a function of the thermal conductivity of the workpiece independent of variations of emissivity, and output means coupled to said last means, said output means being responsive to the last signal to indicate a characteristic of the workpiece.

References Cited

UNITED STATES PATENTS

| 3,206,603 | 9/1965 | Mauro | 250—83.3 |
| 3,261,257 | 7/1966 | Pfister | 88—22.5 |
| 2,658,390 | 11/1953 | Machler | 73—355 |
| 3,020,745 | 2/1962 | Sielicki | 73—15 |

RICHARD C. QUEISSER, *Primary Examiner.*

EDWARD D. GILHOOLY, *Assistant Examiner.*

U.S. Cl. X.R.

73—355; 250—83.3